US008950708B2

(12) United States Patent  
Mouskis et al.

(10) Patent No.: US 8,950,708 B2  
(45) Date of Patent: Feb. 10, 2015

(54) AIR-TO-AIR REFUELING DROGUE ASSEMBLIES

(75) Inventors: Christopher Mouskis, Wimborne (GB); Georgios Filippos Papaioannou, Bournemouth (GB); Adrian Bedford, Dorchester (GB); Richard John Foxwell, Christchurch (GB); James Kemmitt, Ferndown (GB)

(73) Assignee: Flight Refuelling Limited Brook Road, Wimborne, Dorset (GB)

( * ) Notice: Subject to any disclaimer, the term of this patent is extended or adjusted under 35 U.S.C. 154(b) by 262 days.

(21) Appl. No.: 13/368,431

(22) Filed: Feb. 8, 2012

(65) Prior Publication Data

US 2012/0199696 A1 Aug. 9, 2012

(30) Foreign Application Priority Data

Feb. 8, 2011 (GB) .................................. 1102184.7

(51) Int. Cl.  
*B64D 39/00* (2006.01)  
*B64D 39/06* (2006.01)  
*B64D 39/04* (2006.01)  
*B64F 1/28* (2006.01)

(52) U.S. Cl.  
CPC ................ *B64D 39/06* (2013.01); *B64D 39/00* (2013.01); *B64D 39/04* (2013.01); *B64F 1/28* (2013.01)  
USPC ....................................................... 244/135 A

(58) Field of Classification Search  
USPC .............. 244/135 A, 113, 142, 152; 137/615, 137/899.2  
See application file for complete search history.

(56) References Cited

U.S. PATENT DOCUMENTS

| 2,946,543 A * | 7/1960 | Gordon et al. ............ 244/135 A |
| 4,927,099 A | 5/1990 | Emerson et al. |
| 6,145,788 A * | 11/2000 | Mouskis et al. ........... 244/135 A |
| 6,588,465 B1 * | 7/2003 | Kirkland et al. ............... 141/279 |
| 2006/0011782 A1 * | 1/2006 | Schroeder .................. 244/135 A |

FOREIGN PATENT DOCUMENTS

WO WO2008/003933 A1 1/2008

OTHER PUBLICATIONS

UK Intellectual Property Office Search Report, dated Jun. 7, 2011, for corresponding GB application No. 1102184.7.

* cited by examiner

*Primary Examiner* — Valentina Xavier  
(74) *Attorney, Agent, or Firm* — Heslin Rothenberg Farley & Mesiti P.C.; Victor A. Cardona

(57) ABSTRACT

An air to air refuelling drogue assembly includes a reception coupling and a drogue canopy connected to the reception coupling by connection means which hold the canopy in an operative, drag producing, position relative to the reception coupling during refuelling. The drogue assembly is arranged to controllably fail so as to reduce the drag load produced by the drogue when a drag load on the canopy exceeds a predetermined threshold.

14 Claims, 10 Drawing Sheets

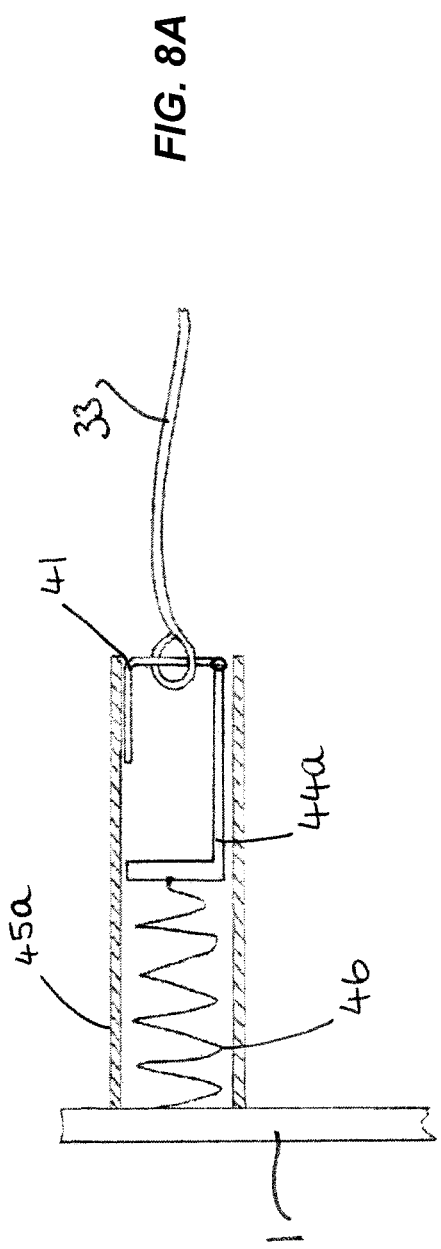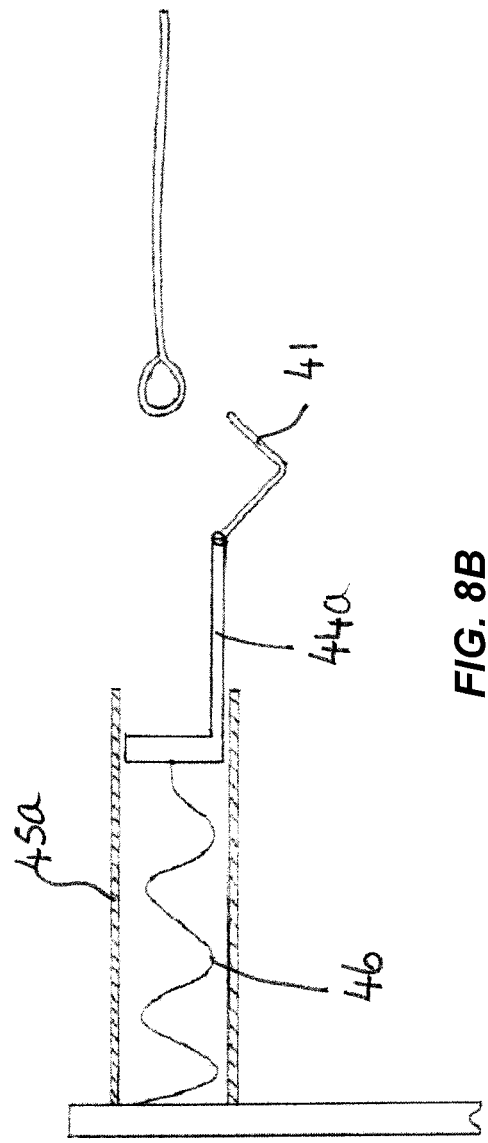
FIG. 8A
FIG. 8B

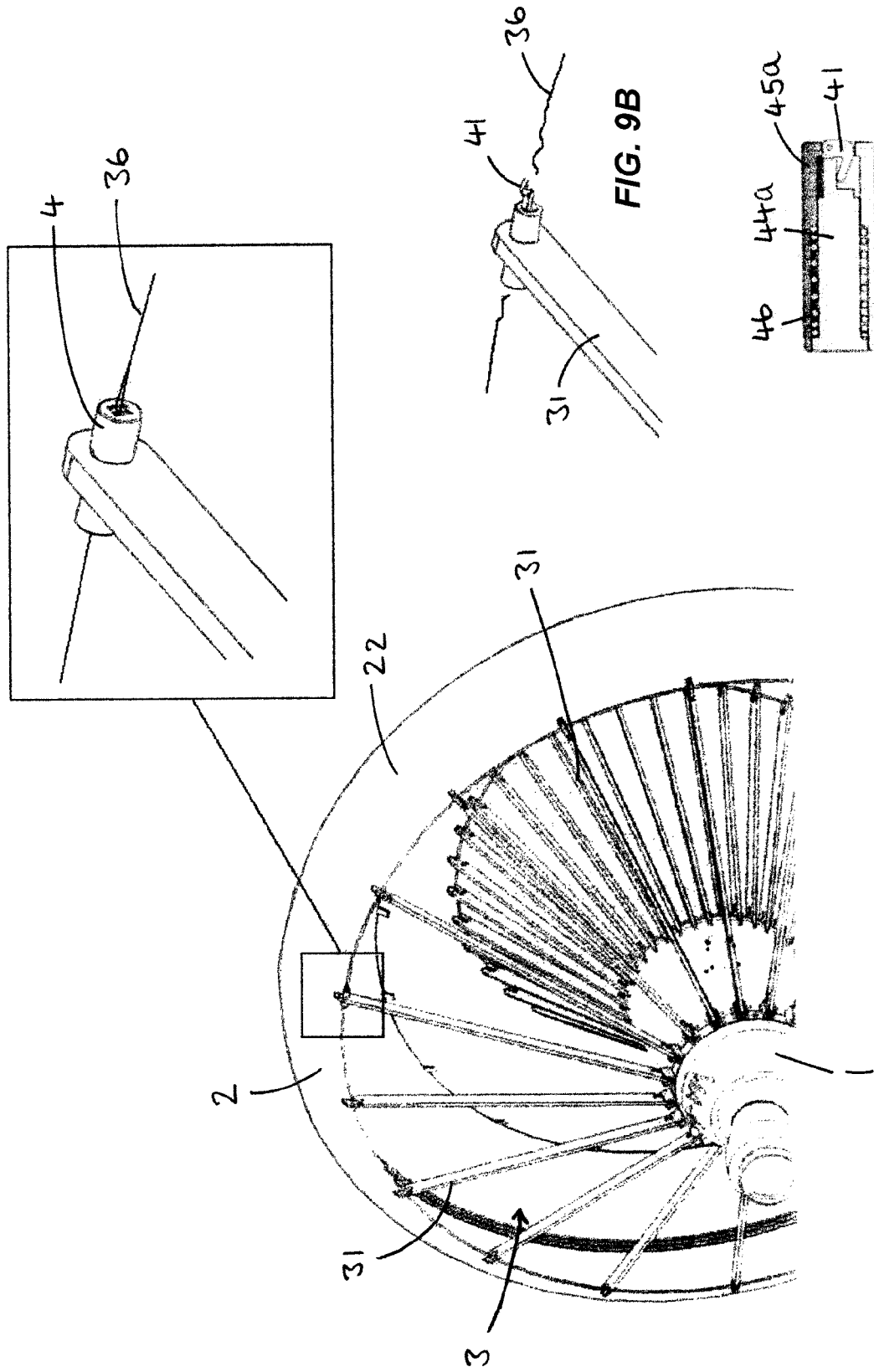

AIR-TO-AIR REFUELING DROGUE ASSEMBLIES

CROSS-REFERENCE TO RELATED APPLICATIONS

This application claims priority from GB patent application number 1102184.7 filed on Feb. 8, 2011, the entire disclosure of which is incorporated herein by reference.

BACKGROUND OF THE INVENTION

This invention relates to air-to-air refuelling drogue assemblies.

In air-to-air refuelling a tanker aircraft deploys a hose allowing a receiver aircraft to engage with the hose and fuel to be transferred. A drogue assembly used in an air-to-air refuelling system generally comprises a reception coupling for mounting at the end of the hose from the tanker aircraft and for accepting a probe from the receiver aircraft. Mounted to this reception coupling is a drogue, in particular a drogue canopy or parachute, which provides drag as the drogue assembly is pulled through the air by the tanker aircraft. This stabilises the drogue assembly and also provides resistance against which the probe of the receiver aircraft can act when connecting into the reception coupling.

The receiver aircraft may be a helicopter or a conventional fixed wing aircraft. In order to refuel helicopters which can typically refuel at a maximum speed of approximately 130 Knots Equivalent Air Speed (KEAS) a drogue assembly with a high drag at low air speed is required. At higher air speed the drag loads from the helicopter refuelling drogue would be excessive leading to dangerous loads on the hose and therefore a smaller drogue is used for refuelling conventional fixed wing aircraft at higher speeds.

This invention is aimed at preventing excessive loads from being generated in the refuelling hose system in a situation where a drogue may be accidentally used or deployed at a higher air speed than intended. The invention is of particular interest in the case of drogue assemblies which will be used in air-to-air refuelling with high drag at relatively low air speed but is not necessarily exclusively for use in such situations.

SUMMARY OF THE INVENTION

According to one aspect of the present invention there is provided an air to air refuelling drogue assembly comprising a reception coupling and a drogue canopy connected to the reception coupling by connection means which hold the canopy in an operative, drag producing, position relative to the reception coupling during refuelling, wherein the drogue assembly is arranged to controllably fail so as to reduce the drag load produced by the drogue when a drag load on the canopy exceeds a predetermined threshold.

Preferably the connection means comprise at least one tether element, at least one latch element, and control means for controlling the latch element, the latch element holding the tether element against release to keep the canopy in the operative position in normal operation and arranged under control of the control means to release the tether element, when a drag load on the canopy exceeds a predetermined threshold, to at least partially release the canopy.

In alternatives the drogue assembly may, for example, be arranged to fail by failure of material—for example failure of a tether element or a portion of the canopy. Material of the drogue assembly, for example a tether element or canopy portion may comprise weakness points or lines chosen to achieve failure at a predetermined drag load. Material failure may lead to at least partial release of the canopy.

According to another aspect of the present invention there is provided an air to air refuelling drogue assembly comprising a reception coupling and a drogue canopy connected to the reception coupling by connection means which hold the canopy in an operative, drag producing, position relative to the reception coupling during refuelling, wherein the connection means comprise at least one tether element, at least one latch element, and control means for controlling the latch element, the latch element holding the tether element against release to keep the canopy in the operative position in normal operation and arranged under control of the control means to release the tether element, when a drag load on the canopy exceeds a predetermined threshold, to at least partially release the canopy.

This arrangement provides a safety release function. If the load on the canopy and hence the refuelling system as a whole is too high the canopy will fail in a controlled way to reduce the drag to safe levels.

The latch element may be arranged for movement between a holding position in which the tether element is held against release and a release position in which the tether element is released from the latch element.

The latch element may be pivotally mounted, and arranged for pivotal movement between the holding position and the release position.

The control means may comprise spring means. Movement of the latch element from the holding position to the release position may be controlled by the spring means.

The spring means may be connected to the latch element such that the spring means resists movement of the latch element caused by load on the tether element attached to the latch element.

The spring means may be connected to the latch element such that the spring means resists movement of the latch element towards the release position.

The connection means may be arranged so that the spring means allows movement of the latch member to the release position when the drag load on the canopy exceeds the predetermined threshold. It will be appreciated that the stiffness of the spring can be selected to control the predetermined threshold of drag load at which the canopy is at least partially released.

The control means may comprise a sensor for determining the drag load on the canopy. The sensor may comprise spring means—as in the statements above—but other forms of sensor may be used. In particular in some embodiments the drag load on the canopy may be determined indirectly, by for example, sensing the air speed of the drogue assembly.

The control means may be arranged to sense the load on the tether element held by the latch element and allow release of the tether element by the latch element when the load on the tether element exceeds a predetermined threshold. This arrangement may use spring means as in the statements above.

There may be a plurality of latch elements each holding at least one respective tether element.

Where there are a plurality of latch elements there may be a master latch element and at least one slave latch element, where the master latch element is controlled in dependence on the drag load on the canopy exceeding a predetermined threshold and the slave latch element is controlled in dependence on the operation of the master latch element.

The control means may be arranged to control a plurality of latch elements. Alternatively, independent control means may be provided for each latch element. In yet a further alternative there may be a central control unit as well as independent control means.

The connection means may comprise at least one latch means comprising a respective one of the latch elements and a respective control means.

There may be a plurality of latch means. One of the latch means may be a master latch means and another of the latch means may be slave latch means.

The at least one tether element may comprise any one of or any combination of: ribs, cords and rails as well as any other appropriate members.

The latch element may be mounted on the reception coupling. In other embodiments however the latch element may be mounted in the connection means between the reception coupling and the canopy, or even on the canopy.

In some embodiments when a tether element is released from the latching element, the respective end of the tether element is left completely free. In other embodiments at least one retaining element is provided to retain the released end of the tether element, but with the canopy at least partially released (or inactivated).

In some embodiments the canopy has at least two sections and the connection means is arranged so that when the drag load on the canopy exceeds the predetermined threshold one section of the canopy is released to reduce drag, whilst another section of the canopy is retained in its operative position.

In some embodiments the two sections of the canopy may be concentrically arranged with one another. In other embodiments the two sections of the canopy may be angularly spaced pockets or sectors of the canopy.

The control means may comprise a retention member for holding the latch element in the holding position. The latch element may be arranged to be moveable relative to the retention member. The latch element may be carried on a support with the support and latch element being movable together relative to the retention member between a position in which the latch element is held in the holding position by the retention member and a position in which the latch element is free to move without hindrance of the retention member towards the release position.

The latch element may be moveably, for example pivotally, mounted on the support. The movement of the latch element without hindrance of the retention member towards the release position may comprise movement relative to the support.

The retention member may comprise a tube portion, within which the latch element is arranged to move, or within which the latch element and support are arranged to move together. The latch element may be generally L-shaped. One arm of the L-shaped latch element may bear against the retention member when held in the holding position.

According to another aspect of the present invention there is provided an air to air refuelling drogue assembly comprising a reception coupling and a drogue canopy connected to the reception coupling by connection means which hold the canopy in an operative, drag producing, position relative to the reception coupling during refuelling, wherein the connection means comprise a safety release mechanism to at least partially release the canopy when a drag load on the canopy exceeds a predetermined threshold.

According to another aspect of the present invention there is provided an air to air refuelling drogue assembly comprising a reception coupling and a drogue canopy connected to the reception coupling by a connection arrangement which holds the canopy in an operative, drag producing, position relative to the reception coupling during refuelling, wherein the connection arrangement comprises a safety release mechanism to at least partially release the canopy when a drag load on the canopy exceeds a predetermined threshold.

According to another aspect of the present invention there is provided an air to air refuelling drogue assembly comprising a reception coupling and a drogue canopy connected to the reception coupling by a connection arrangement which holds the canopy in an operative, drag producing, position relative to the reception coupling during refuelling, wherein the connection arrangement comprises at least one latch and at least one tether element, the latch holding the tether element against release to keep the canopy in the operative position in normal operation and arranged to release the tether element when a drag load on the canopy exceeds a predetermined threshold to at least partially release the canopy.

BRIEF DESCRIPTION OF THE DRAWINGS

The present invention will now be described, by way of example only, with reference to the accompanying drawings in which:

FIGS. 8A and 8B show more detail of the release mechanism of the drogue assembly shown in FIG. 7;

FIGS. 9A to 9C show another alternative drogue assembly having yet another release mechanism different from that of the drogue assemblies of FIGS. 1 and 7.

DETAILED DESCRIPTION OF THE DRAWINGS

Figure 1:
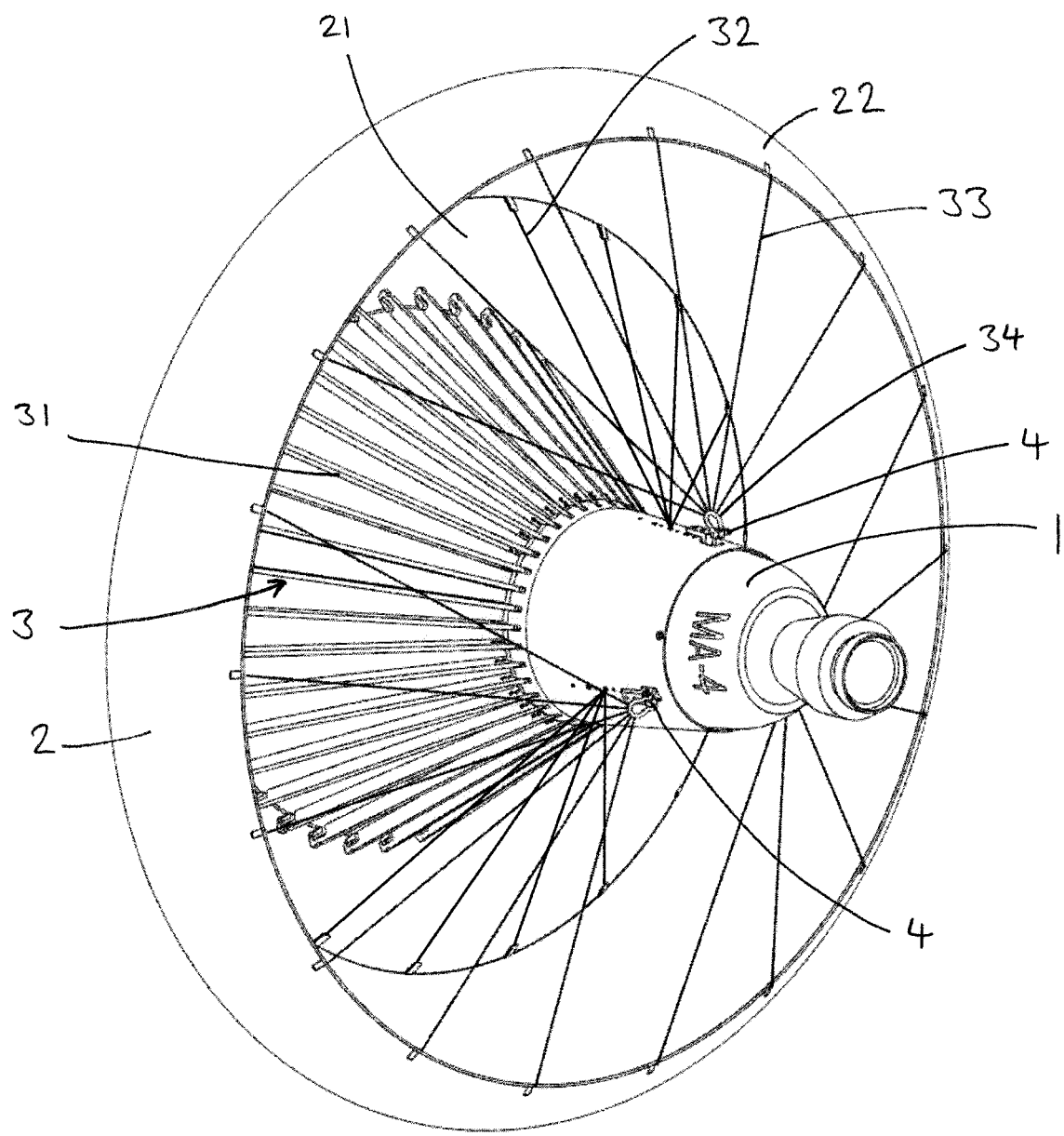
FIG. 1 schematically shows an air-to-air refuelling drogue assembly.

FIG. 1 shows a drogue assembly comprising a reception coupling 1 which is for connection to a refuelling hose (not shown) and arranged to accept a probe from a receiving aircraft (not shown) which is to be refueled by the refuelling system. A drogue canopy 2 is connected to the reception coupling 1 by various connection means 3. In this embodiment the drogue canopy 2 has two main concentric sections 21 and 22. A first section 21 is an inner bubble-like section and a second section 22 is an outer bubble-like section.

An inner edge of the inner section 21 is connected to the reception coupling 1 via a plurality of ribs 31 which can also serve to help guide the probe (not shown) of the receiving aircraft into the reception coupling 1. An outer edge of the inner section 21 of the canopy 2 is connected to the inner edge of the outer section 22 and this joining line between the two sections is connected via a first set of cords 32 to a first set of securing points on the reception coupling 1. The outer edge of the outer section 22 of the canopy 2 is connected to the reception coupling 1 at a second set of securing points via a respective second set of cords 33.

In this embodiment each set of cords 32, 33 is connected in subsets to three respective connection locations equally spaced around the outer surface or shroud of the reception coupling 1. In this embodiment there are thus six attachment points, three for the first set of cords 32 and three for the second set of cords 33. Further in this embodiment these two sets of attachment locations are angularly aligned with one another but this is not essential.

In this embodiment the first set of cords 32 and the ribs 31 are permanently attached to the reception coupling 1 as well as to their respective connection points on the canopy 2. On the other hand the second set of cords 33 retaining the outer edge of the second section of the canopy 22 are releasably connected to the reception coupling 1 as will be explained in more detail below.

Figure 2:
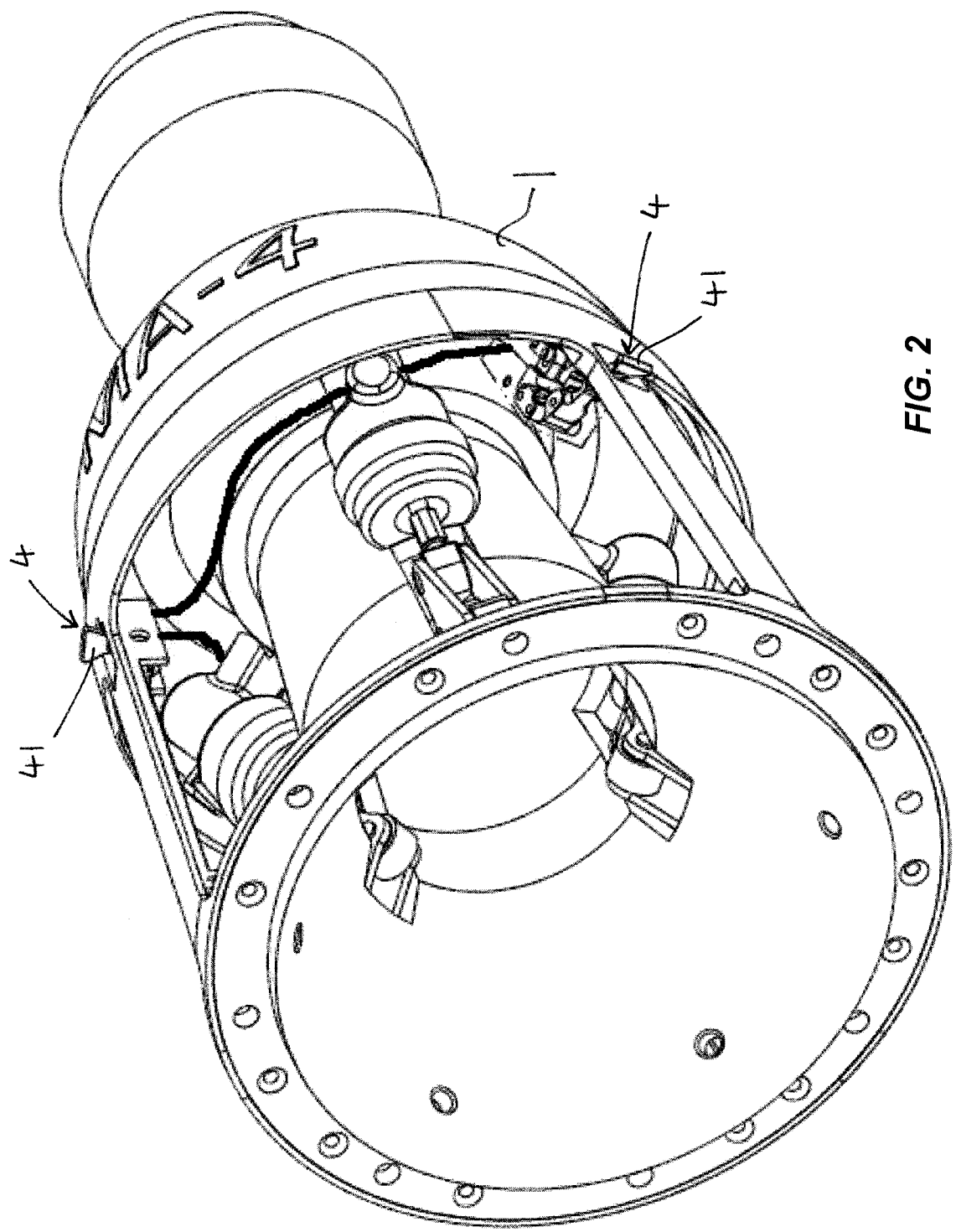
FIG. 2 schematically shows a reception coupling of the drogue assembly shown in FIG. 1.

FIG. 2 shows the reception coupling of the drogue assembly 1 in isolation and with part of the outer housing removed. The second set of cords 33 holding the outer edge of the canopy 2 are connected to the reception coupling 1 via two latch mechanisms 4 which are arranged to releasably retain the respective cords 33 to provide the release functionality mentioned above. Two of these latch mechanisms 4 may be seen in FIG. 1, and two of the latch mechanisms 4 may be seen in FIG. 2.

Figure 6:
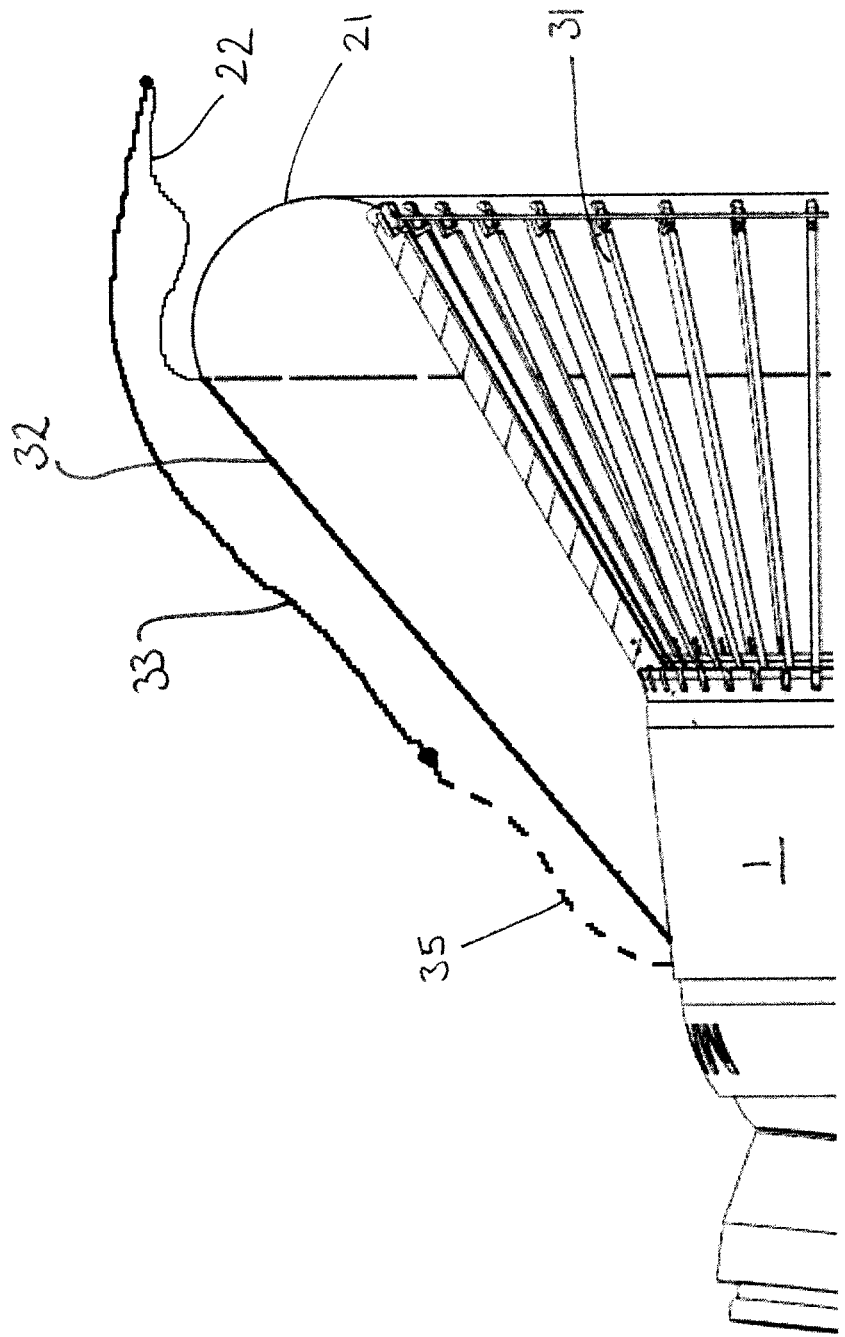
FIG. 6 shows a side view of parts of the drogue assembly shown in FIG. 1 when a section of the canopy has been released.

Each of the latch mechanisms 4 has a latch element 41 which is arranged to hold the cords 33 in position. In this embodiment, as can be seen in FIG. 1, the cords held in position by each latch 4 are in fact connected to an eye 34 which eye 34 fits over the latch element 41. In each case the latch element 41 may be moved between a holding or retaining position in which the cords 33 are held in position by the latch 4 and a release position in which the cords 33 are released. When each of the latch elements 41 is in the release position, the cords 33 are released and hence the outer section of the canopy 22 is released as illustrated in FIG. 6 and hence the drag load on the drogue assembly will be significantly reduced.

In the present embodiment one of the latches 4 is a load sensing latch which is arranged to move to its release position when a drag load on the canopy 2 exceeds a predetermined threshold whereas the other two latches 4 are slave latches which are released in dependence on the state of the load sensing latch 4.

Figure 3:
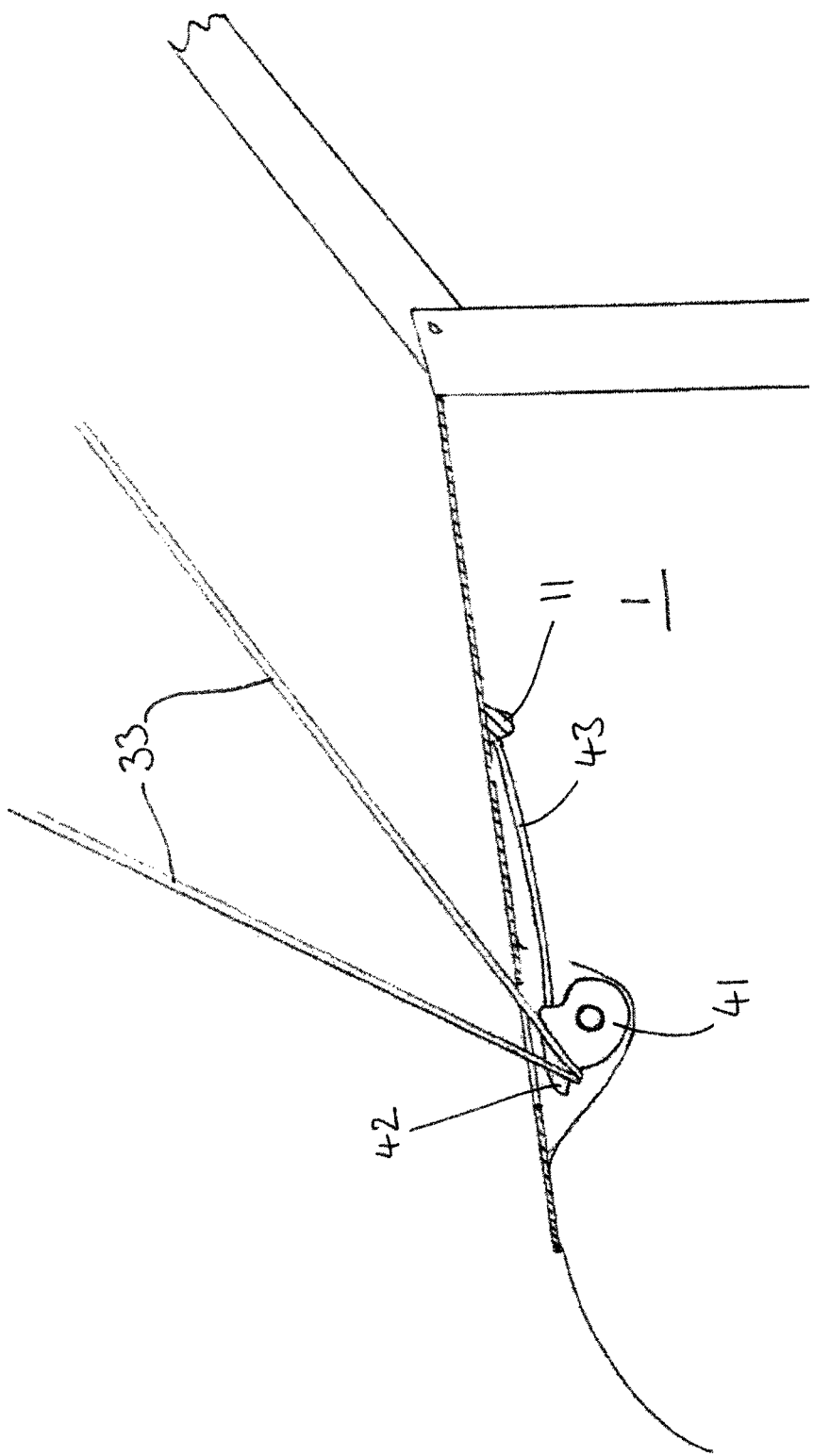
FIG. 3 schematically shows part of the drogue assembly of FIG. 1 illustrating a latch mechanism for retaining cords that connect a canopy of the drogue assembly to the reception coupling of the drogue assembly where the latch mechanism is in a holding position.
Figure 4:
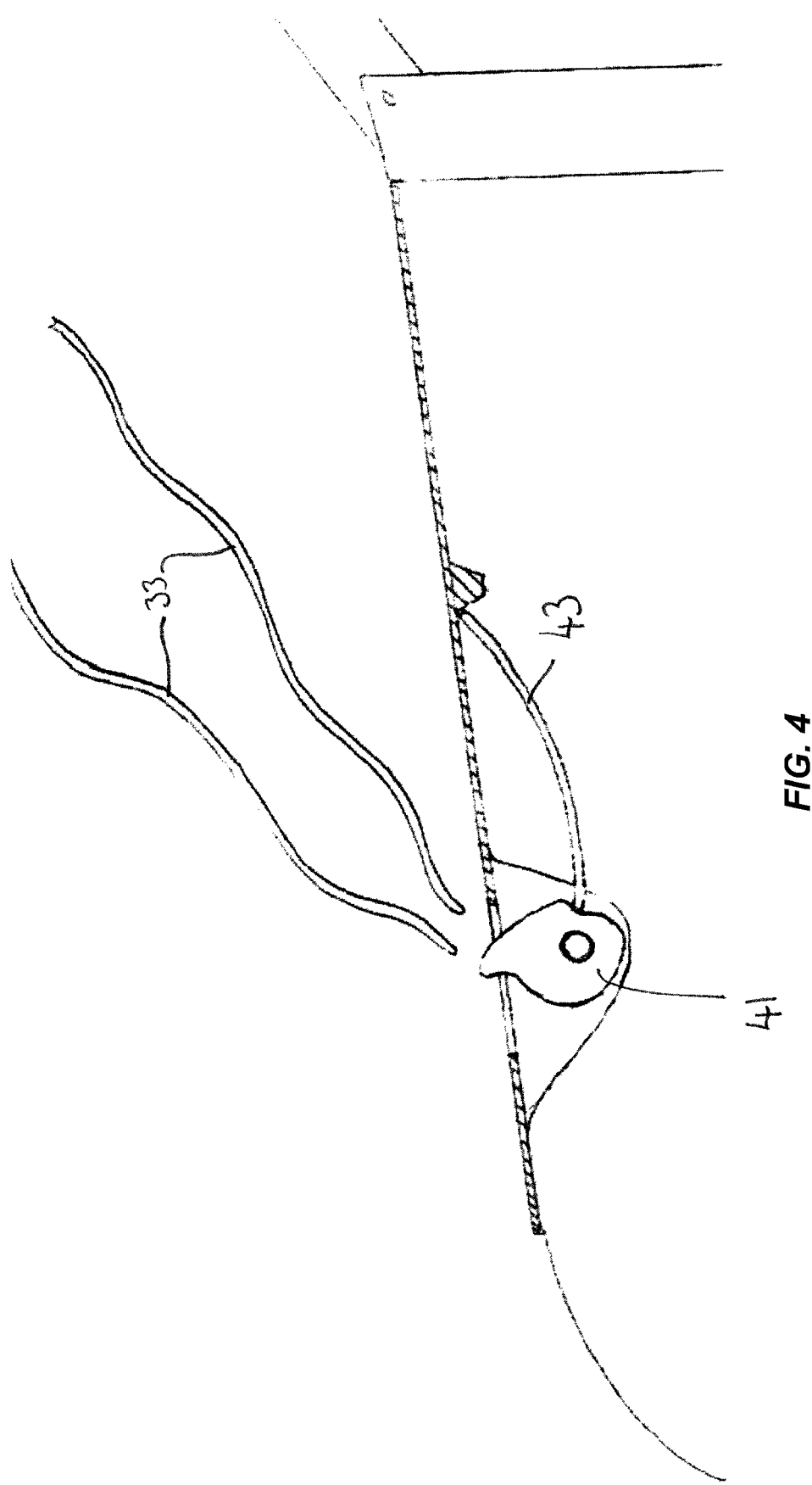
FIG. 4 shows the latching arrangement of FIG. 3 but in a release position.

FIGS. 3 and 4 show more details of the load sensing latch 4 in the present embodiment. It should be appreciated that different forms of load sensing latch can be used in alternative embodiments.

Referring in particular to FIG. 3, the load sensing latch 4 comprises a respective latch element 41 which is pivotally mounted in the reception coupling and has a retaining projection 42 on which the cords 33 (or more particularly the eye 34 in the present embodiment) may be retained. The latch element 41 is able to pivot around its mounting between a retaining position as shown in FIG. 3 and a release position as shown in FIG. 4.

A spring in the form of a buckling member 43 is provided to control the movement of the latch element 41. One end of this buckling member 43 abuts against a shoulder of the latching element 41 and another end of this buckling member 43 abuts against a stop 11 provided within the reception coupling. As the latching element 41 rotates from the retaining position shown in FIG. 3 to the release position shown in FIG. 4 this serves to bend the buckling member 43 which in turn resists this pivotal movement of the latching member 41. Thus when relatively low (or in other words, acceptable) loads are exerted via the cords 33 due to the drag on the canopy 2 the buckling member 43 is able to resist the pivotal movement of the latch element 41 such that the latch element 41 remains in a retaining position and the cords 33 are retained. However if the load on the canopy exceeds a predetermined threshold the buckling member 43 will be bent sufficiently, as shown in FIG. 4, such that the latching element 43 may rotate to the release position so releasing the cords 33. Once this has occurred the relevant portion of the outer section of the canopy 22 will be released.

In some embodiments, similar load sensing latching mechanisms 4 could be provided for each of the latching mechanisms. However, in the present embodiment, the other two latching mechanisms 4 are slave latches which are operated by operation of the load sensing latch 4.

Figure 5:
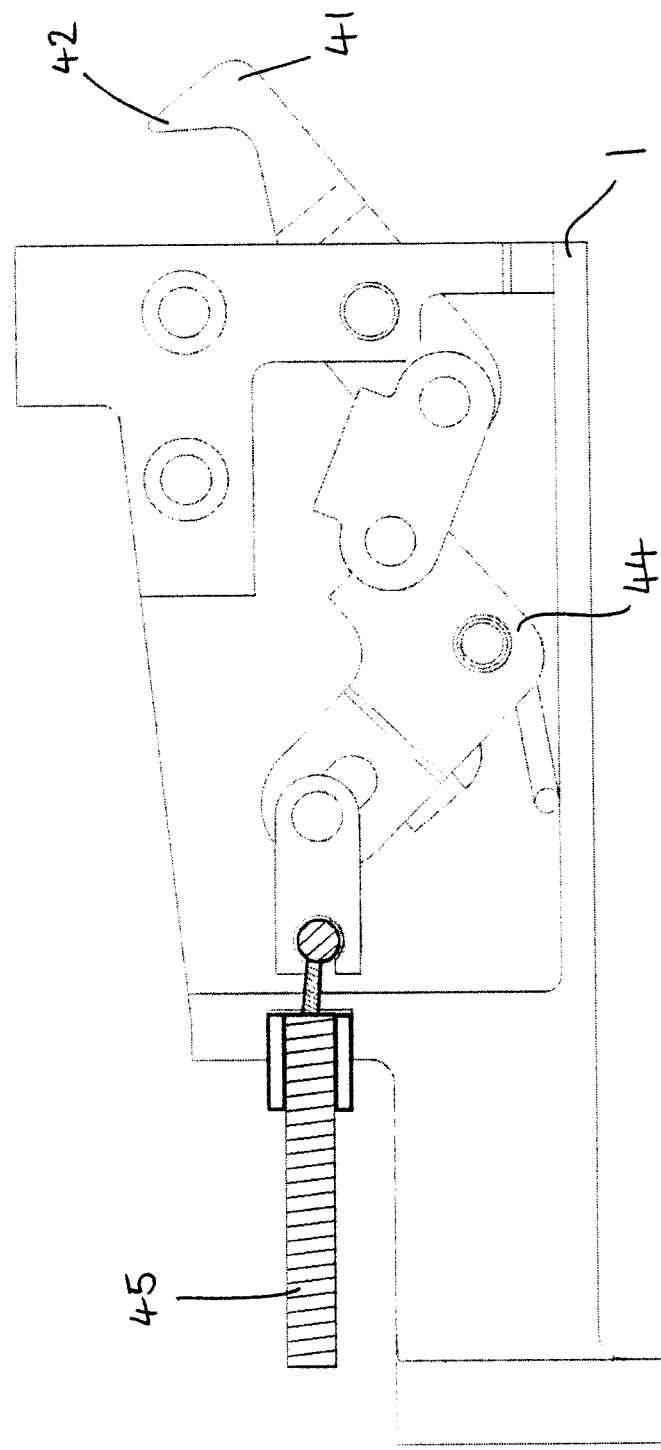
FIG. 5 schematically shows a slave latching arrangement of the reception coupling shown in FIG. 2.

FIG. 5 shows more detail of one of the slave latches 4. Here again there is a latching element 41 for retaining the respective set of cords 33 during normal operation. This latching element 41 is pivotally mounted in the reception coupling 1 and has an associated drive mechanism 44 which is biased towards keeping the latching element 41 in the retaining position but is connected via a respective cable 45 to the load sensing latch 4 such that as the latching element 41 of the load sensing latch 4 moves to its release position, this serves to operate on the cable 45 so as to drive the slave latch 4 to its release position. Both the slave latches of the drogue assembly shown in FIGS. 1 to 6 have the structure of the slave latch shown in FIG. 5.

Thus in the present embodiment, as the load on the canopy 2 exceeds a predetermined threshold, as determined by the load sensing latch, and in particular the stiffness of the buckling member 43, all of the three latches 4 move to a release position releasing the respective cords 33 so that the outer section of the canopy 22 is released to the position shown in FIG. 6.

In a development of the drogue assembly shown in FIGS. 1 to 6, rather than the free end of the cords 33 released by the latches 4 being released completely freely on release from the latches 4, additional lengths of tethering cord 35 (one of which is shown in dotted lines in FIG. 6) may optionally be provided. These retain the end of the cords 33 after they have been released from the latches 4 such that the canopy section is released to be inoperative, but the cords 33 are not free to fly around. In one particular implementation of this alternative, each of the cords 33 may have an additional portion of length stored inside the reception coupling and the cords 33 may be latched in their operative position by the latches acting at a point midway along the total length of the cord such that when the latch 4 releases the cord 33, the remainder of the cord may run out of the reception coupling allowing the canopy to move to its release position. To put this another way, the cords 33 connected to the outer edge of the canopy 2 may be latched midway along their length.

It will be appreciated that in alternatives, rather than the cords 33 at the outer edge of the canopy being released by a release mechanism to allow partial release of the canopy 2, it is equally possible to release other parts of the connection means 3 between the reception coupling and the drogue canopy 2. Thus, for example, in the drogue assembly shown in FIG. 1 where there are two sets of cords and one set of ribs, it would be possible to release either of the sets of cords or both sets of the cords or to release the canopy from the ribs or so on. Further in some implementations all of the connection points between the canopy and the reception coupling 1 may be released such that the canopy is completely released from the reception coupling and, in use could fly away from the reception coupling.

Figure 7:
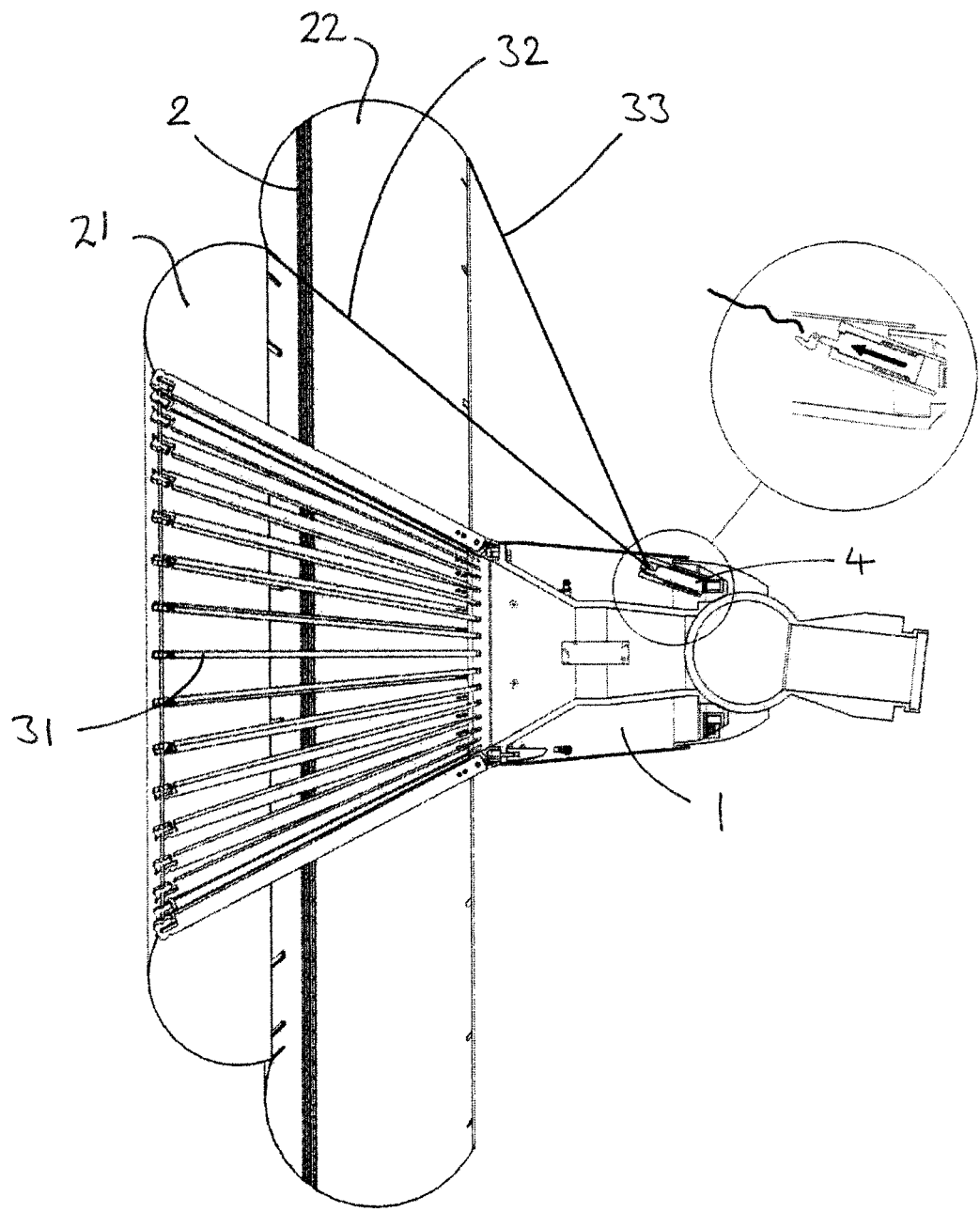
FIG. 7 shows an alternative drogue assembly including a different release mechanism from that of the drogue assembly shown in FIG. 1.

FIG. 7 shows an alternative drogue assembly which again has a reception coupling 1, a canopy 2, and connection means 3 between the canopy 2 and reception coupling 1 in the form of ribs 31 and cords 32, 33. Here both sets of cords 32, 33 holding the respective outer edges of the first 21 and second 22 sections of the canopy 2 are retained by respective latches 4 (only one of which is shown in FIG. 7). Thus, in this example, when the latch 4 releases the cords 32, 33 the whole of the canopy will be released to a low drag configuration although the canopy will be retained on the reception coupling via the ribs 31.

In this particular embodiment, an alternative form of latch 4 is provided. This alternative latch 4 is shown in more detail in FIGS. 8A and 8B. As shown in FIGS. 8A and 8B in this instance, the release mechanism comprises an L-shaped latch element 41 which is hingedly mounted to an L-shaped support portion 44a which are arranged to slide together within a tube portion 45a which is mounted in the reception coupling 1. A helical spring 46 is connected between the support portion 44a and the reception coupling 1 structure such that movement of the support portion 44a and latch element 41 up and down the length of the tube portion 45a is controlled by the spring 46.

The respective canopy cords 32, 33 are retained on the latch element 41 whilst the latch element 41 is held within the tube portion 45a in a retaining position as shown in FIG. 8A. However as tension on the cord portions 32, 33 increases due to increased drag load on the canopy 2, the latch element 41 and support portion 44a move against the resistance of the spring 46 out of the tube 45a. At high enough loads, this continues until the free end of the L-shaped latch element 41 is no longer retained by the tube wall 45a at which point the latch element 41 may hinge around its hinge point to the position shown in FIG. 8B so releasing the retained cords 32, 33. Again the latch mechanism and in particular the length of the tube portion 45a and/or strength of the spring 46, may be selected to determine the threshold level of drag load on the canopy 2 which may be tolerated before the latch element 41 is drawn out of the tubing such that it may move to its release position and release the cords 32, 33.

FIGS. 9A to 9C show another alternative drogue assembly. Again this has the same basic structure of a reception coupling 1 and a canopy 2 connected to the reception coupling 1 by connection means 3. Here however there are two sets of ribs 31. The first set corresponds to the ribs 31 in the embodiments described above and the second set replace the cords 33 in the embodiments described above that hold the outer edge of the second canopy section 22. In this embodiment, as shown in the enlarged detail section of FIG. 9A, the outer section of the canopy 22 is connected to the respective set of ribs 31 using a circumferential length of cord or cords 36. These cord or cords 36 are retained in position by at least one latch arrangement 4 of a similar type to that described above with reference to FIGS. 8A and 8B. If the load on the canopy 2 exceeds a predetermined threshold then as described above in relation to FIGS. 8A and 8B, the respective latching element 41 of the latch retaining the canopy cord 36 will be pulled out of its tubular portion 45a so that the cord 36 can be released. As a result of this, a respective section or pocket of the canopy 22 is released or possibly the whole of the outer section 22 of the canopy is released.

FIG. 9B shows one of the respective ribs 31 with the latching element 41 in its release position and the cord 36 released.

FIG. 9C is a sectional view of the latch mechanism 4 of the embodiment shown in FIGS. 9A and 9B. This has the same functional arrangement of the latch mechanism shown in FIGS. 8A and 8B and described above, but a slightly different structure. There is again a generally L-shaped latch element 41 which is retained in a tube-like portion 45a to retain the cord 36 whilst loads do not exceed the predetermined threshold. Here, however, the support portion 44a for the latch element 41 has a cylindrical shape and the spring 46 to resist movement of the support portion 44a and latch element 41 surrounds the cylindrical support portion 44a. The spring 46 bears against a respective shoulder on the cylindrical support portion 44a and a respective shoulder inside the tube portion 45a.

Figure 10A:
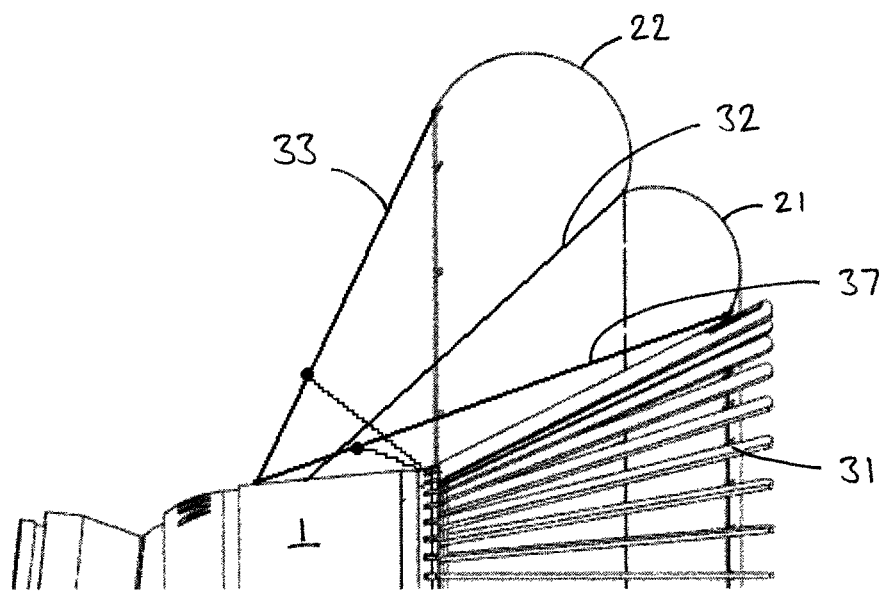
FIGS. 10A and 10B show part of a further drogue assembly having yet another release mechanism with the canopy shown retained in FIG. 10A and released in FIG. 10B.
Figure 10B:
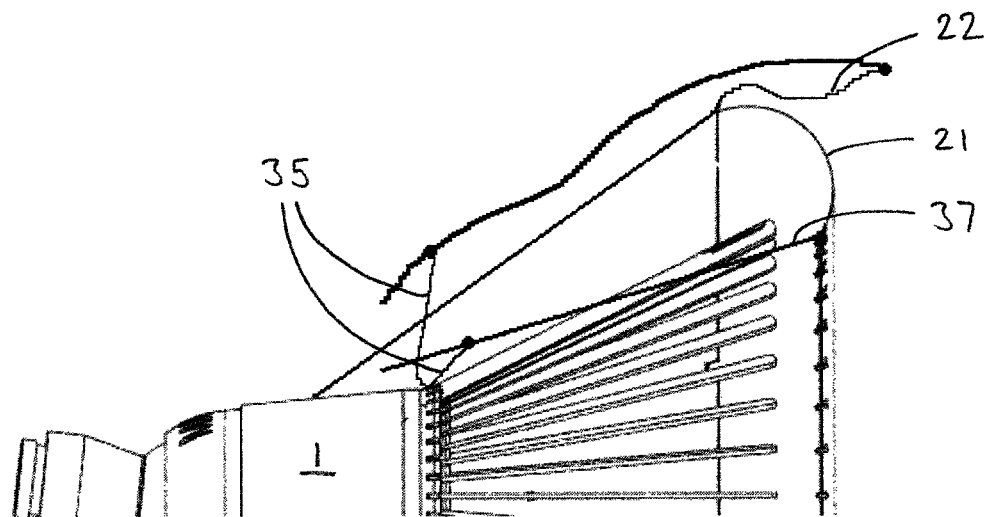

FIGS. 10A and 10B show yet another drogue assembly having the same general form as that shown in FIG. 1. Here, however, the connection means 3 comprises:

one set of ribs 31;

a first set of cords 32 retaining the portion of the canopy 2 between the inner section 21 and outer section 22;

a second set of cords 33 retaining the outer edge of the second section of the canopy 22;

a third set of cords 37 retaining the inner edge of the inner canopy section 21.

Here the second and third set of cords 33 and 37 are both releasably connected to the reception coupling 1. In this particular embodiment, they are both connected to the same attachment point, for example the same releasable latch 4 of one of the types described above. Further, the attachment between the inner edge of the inner canopy section 21 and the end of the ribs 31 is also releasable. Moreover both the second set of cords 33 and the third set of cords 37 are tethered by respective tethering cords 35 such that when the ends of the respective cords 33, 37 are released from the reception coupling 1 they are not completely released but rather retained by the tethering cords 35 in a release position.

FIG. 10A shows the current drogue assembly when in its operative drag producing position with the second and third set of cords 33 and 37 retained in their normal operating position by the respective latches (not shown). On the other hand FIG. 10B shows the position where the second and third sets of cords 33, 37 have been released and the attachments between the inner edge of the first canopy section 21 and the ribs 31 have also been released. Thus, in this state, the junction between the first and second canopy sections 21, 22 is still held in position and connected to the reception coupling 1 via the first set of cords 32 but the outer section of the canopy 22 is released so that it stops producing drag. Further the third set of cords 37 are released from their primary attachment point on the reception coupling 1 but their free ends are retained in position by the respective retaining tethering cords 35. This means that the inner edge of the inner section of the canopy 21 is retained in a new position which still allows that canopy section 21 to be at least partially operative whilst no longer being connected to the end of the ribs 31.

It will be appreciated that the different latching mechanisms used in the different embodiments described above may, in general terms, be used interchangeably with one another. Similarly sensing latches and slave latches may in general be used interchangeably. Thus whilst various features concerning the latching and release arrangements have been described independently in respect of different embodiments described above it should be considered that these can be used together with one another in any workable configurations that can be arrived at.

The invention claimed is:

1. An air to air refuelling drogue assembly comprising:
a reception coupling and a drogue canopy connected to the reception coupling by a connection arrangement which holds the canopy in an operative, drag producing, position relative to the reception coupling during refuelling, the connection arrangement comprising at least one tether element, at least one latch element, and a control arrangement for controlling the latch element, the latch element holding the tether element against release to keep the canopy in the operative position in normal operation and arranged under control of the control arrangement to release the tether element, when a drag load on the canopy exceeds a predetermined threshold, to at least partially release the canopy.

2. An air to air refuelling drogue assembly according to claim 1 in which the control arrangement comprises sensor means responsive to the drag load on the canopy.

3. An air to air refuelling drogue assembly according to claim 1, in which the control arrangement is arranged to sense the load on the tether element held by the latch element and allow release of the tether element by the latch element when the load on the tether element exceeds a predetermined threshold.

4. An air to air refuelling drogue assembly according to claim 1 in which the latch element is arranged for movement between a holding position in which the tether element is held against release and a release position in which the tether element is released from the latch element.

5. An air to air refuelling drogue assembly according to claim 1 in which the control arrangement comprises a spring means.

6. An air to air refuelling drogue assembly according to claim 4 in which the control arrangement comprises a spring means and in which movement of the latch element between the holding position and the release position is controlled by the spring means.

7. An air to air refuelling drogue assembly according to claim 5 in which the spring means is connected to the latch element such that the spring means resists movement of the latch element caused by load on the tether element attached to the latch element.

8. An air to air refuelling drogue assembly according to claim 5 in which the connection arrangement is arranged so that the spring means allows movement of the latch member to the release position when the drag load on the canopy exceeds the predetermined threshold.

9. An air to air refuelling drogue assembly according to claim 1 comprising a plurality of latch elements each holding at least one respective tether element.

10. An air to air refuelling drogue assembly according to claim 9 in which there is a master latch element and at least one slave latch element, where the master latch element is controlled in dependence on the drag load on the canopy exceeding a predetermined threshold and the slave latch element is controlled in dependence on the operation of the master latch element.

11. An air to air refuelling drogue assembly according to claim 1 in which the canopy has at least two sections and the connection arrangement is arranged so that when the drag load on the canopy exceeds the predetermined threshold one section of the canopy is released to reduce drag, whilst another section of the canopy is retained in its operative position.

12. An air to air refuelling drogue assembly according to claim 4 in which the control arrangement comprises a retention member for holding the latch element in the holding position.

13. An air to air refuelling drogue assembly according to claim 12 in which the latch element is carried on a support with the support and latch element being movable together relative to the retention member between a position in which the latch element is held in the holding position by the retention member and a position in which the latch element is free to move without hindrance of the retention member towards the release position.

14. An air to air refuelling drogue assembly comprising a reception coupling and a drogue canopy connected to the reception coupling by connection means which hold the canopy in an operative, drag producing, position relative to the reception coupling during refuelling, wherein the connection means comprise at least one tether element, at least one latch element, and control means for controlling the latch element, the latch element holding the tether element against release to keep the canopy in the operative position in normal operation and arranged under control of the control means to release the tether element, when a drag load on the canopy exceeds a predetermined threshold, to at least partially release the canopy.

* * * * *

UNITED STATES PATENT AND TRADEMARK OFFICE
CERTIFICATE OF CORRECTION

PATENT NO. : 8,950,708 B2
APPLICATION NO. : 13/368431
DATED : February 10, 2015
INVENTOR(S) : Mouskis et al.

Page 1 of 1

It is certified that error appears in the above-identified patent and that said Letters Patent is hereby corrected as shown below:

On the Title Page

In the Assignee Item (73): Delete "Flight Refuelling Limited Brook Road" and insert -- Flight Refuelling Limited --

Signed and Sealed this
Twenty-third Day of June, 2015

Michelle K. Lee
*Director of the United States Patent and Trademark Office*